United States Patent [19]

Lee

[11] Patent Number: 4,469,296
[45] Date of Patent: Sep. 4, 1984

[54] FISHING KITE

[76] Inventor: Richard P. Lee, 1439 S. 134th St., Omaha, Nebr. 68144

[21] Appl. No.: 357,990

[22] Filed: Mar. 15, 1982

[51] Int. Cl.³ .................. B64C 31/06; B64D 17/02
[52] U.S. Cl. ............................ 244/153 R; 244/145
[58] Field of Search ........................ 244/153 R, 145

[56] References Cited

U.S. PATENT DOCUMENTS

| 3,285,546 | 11/1966 | Jalbert | 244/145 |
| 3,740,008 | 6/1973 | Gravel | 244/153 R |
| 3,806,071 | 4/1974 | Brown | 244/153 R |
| 4,129,272 | 12/1978 | Jones et al. | 244/153 R |
| 4,221,351 | 9/1980 | Holland, Jr. | 244/153 R |

Primary Examiner—Galen L. Barefoot
Attorney, Agent, or Firm—Zarley, McKee, Thomte, Voorhees & Sease

[57] ABSTRACT

A foldable kite has generally trapezoidal shaped top and bottom panels joined together along the side edges and along a plurality of securement lines generally equally spaced between the side edges. The kite has a single bridle having only two arms connected at the front corners of the kite.

3 Claims, 8 Drawing Figures

FISHING KITE

BACKGROUND OF THE INVENTION

1. Field of the Invention

This invention relates generally to foldable kites and in particular to an improved foldable kite adapted for use in fishing, including the clips and release pins used in a kite fishing system.

2. Prior Art

Fishing tackle, including rods and reels, hooks and related equipment, has been employed for centuries to catch fish. One of the problems involved in using such fishing tackle is that the fisherman is limited in the extent of water in which he may fish. The fishing range is limited because he must throw the tackle manually with the use of energy stored in the fishing rod. In the best case, a manual cast only nets 50 to 500 yards without specialized equipment.

One way to extend the fishing range is to use a boat. Unfortunately, when using boats it has been shown that the sight and sounds of the boat tends to frighten fish away from its vicinity. Once again, the fisherman must manually cast many yards away from the vicinity of the boat in order to effectively utilize his tackle.

It was observed that a kite carried aloft by wind generates sufficient lift to carry fishing tackle, thus increasing the cast available to the fisherman. One such system is shown in U.S. Pat. No. 3,462,870 to Terelli. Another is shown in U.S. Pat. No. 3,358,399 to Waldman. Another kite fishing system is shown in French Pat. No. 1,262,033 to Buland. All of these prior art fishing systems employ conventional kites which are designed to fly at a great height to the horizon. Such a conventional kite is sufficient for a kite fishing system until one wishes to extend the cast out a great distance. In that case a kite is needed which will provide sufficient lift so as not to prematurely drop the fishing tackle into the water and yet allow greater horizontal range.

If the conventional kite when used in a fishing system is allowed to contact the water, the structural members within the kite anchor the kite and do not allow for its retrieval. Also, conventional kites when striking the water are often destroyed.

Certain lifting devices were discovered which were not kites but rather parachutes and the like in that internal bracing and structural support is unecessary in their construction. The constant movement of air provides sufficient structure. One such invention is shown in U.S. Pat. No. Re. 26,427 to Jalbert for a parachute type, multicell aerial device. Unfortunately, such parachute devices require a multitude of shrouds and weight supporting lines.

If a kite could be developed that could combine the non-rigid structural methods of a multi-celled parachute while providing flying characteristics which enable the kite to be flown closer to the horizontal in light to medium strong wind, it would certainly provide a great improvement in kite fishing systems. If that improved kite also was designed to provide a low aspect ratio and a low lift to drag ratio while being constructed out of a strong, lightweight fabric, it would even further improve kite fishing, particularly if an improved kite line clip and fishing line release pin were provided. The instant invention is directed toward these and other needs for an improved kite, and an improved kite fishing system.

SUMMARY OF THE INVENTION

It is a feature of the invention to provide an improved kite.

It is another feature of the instant invention to provide an improved kite which is extremely stable.

It is another feature of the instant invention to provide an improved kite which exhibits a jet effect by use of a tubular construction.

It is another feature of the instant invention to provide an improved kite which flies low to the horizon and yet provides sufficient lift.

It is yet another feature of the instant invention to provide a lightweight kite without rigid structural support.

It is a further object of the invention to provide a recreational kite which is foldable, lightweight and easily portable.

It is still a further object of the invention to provide a kite fishing system having a novel release pin and kite line clip.

These and other features and objects are attained according to the instant invention by providing a novel kite having textile tubular construction, a simple two-line bridle and a separate kite line clip and release pin.

BRIEF DESCRIPTION OF THE DRAWINGS

The advantages of this invention will become apparent upon consideration of the following detailed disclosure of the invention, especially when taken in conjunction with the accompanying drawings, wherein.

DESCRIPTION OF THE PREFERRED EMBODIMENT

The apparatus to be discussed in detail below is a unique application to kite fishing systems which employs a particular kite design.

Figure 1:
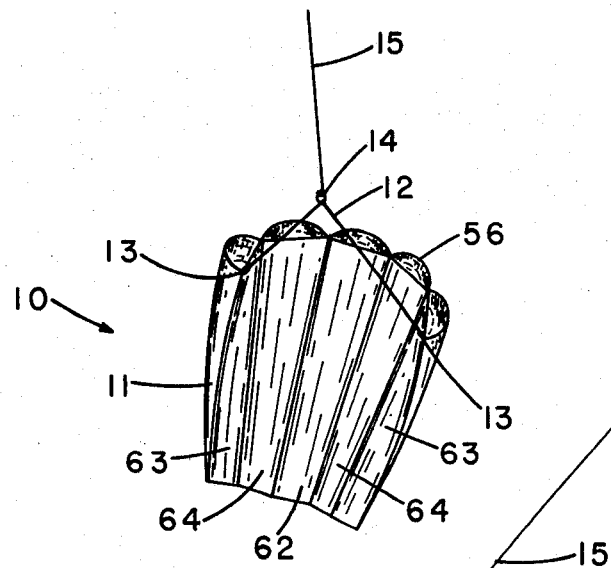
FIG. 1 is a perspective view of the kite utilized in the instant invention showing the tubular fabric flow-through construction.
Figure 5:
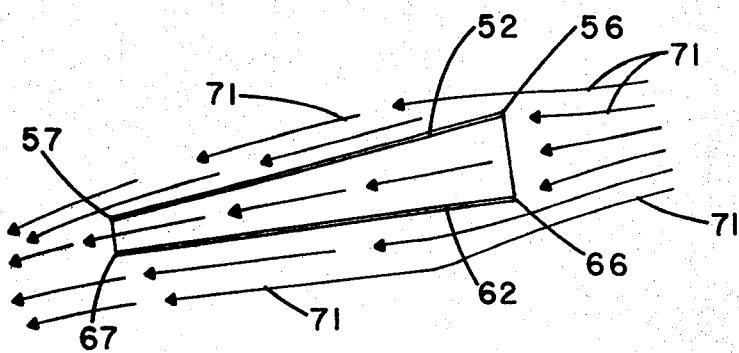
FIG. 5 is right side cross sectional view of the kite showing the flow through nature of air currents.

The kite of the instant invention is shown generally at 10 in FIG. 1. Kite 10 is provided with tubular openings 56 in kite body 11 to allow air to flow from the front portion of the kite rearward and exiting in a jet-like tube, as shown in FIG. 5. The kite body 11 is comprised of a plurality of such tube-like jets. A kite bridle 12 is attached to bridle attachment points 13 so that when kite 10 is lifted by the wind, kite line 15 pulls by use of bridle 12 on bridle attachment points 13 to cup kite body 11 in a characteristic flying arch.

Figure 6:
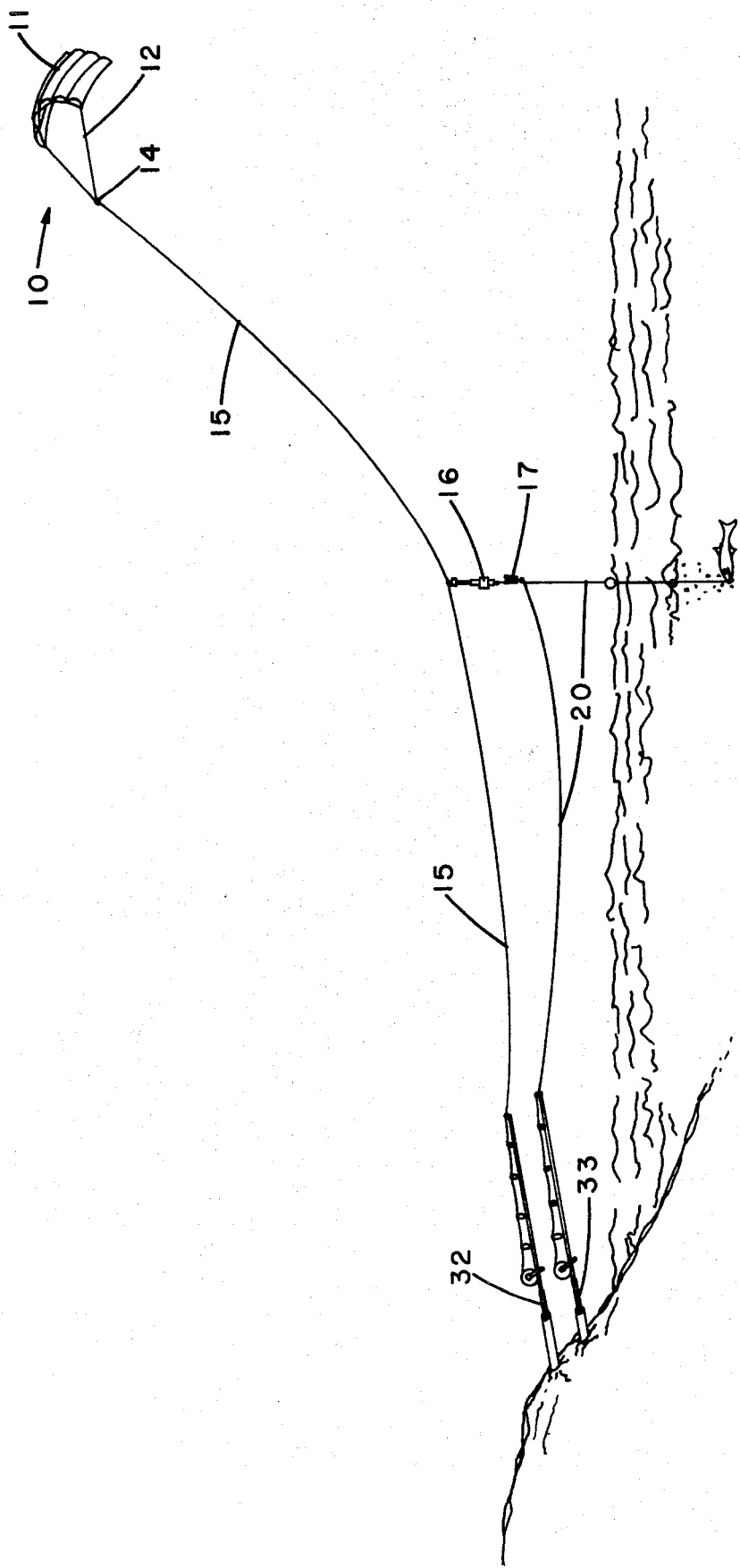
FIG. 6 is a right side elevational view of the kite fishing system showing the kite flowing from a conventional rod and reel and a second rod and reel having the fishing line attached to the kite by way of the kite line clip and fishing line release pin.

Attention is directed to FIG. 6 where kite body 11 is shown in flight. It is also shown in FIG. 6 that bridle 12 is comprised of two lines of substantially equal length which are attached not only a bridle attachment points 13 as shown in FIG. 1, but also at the apex of bridle 14 where they are attached to kite line 15. By varying the length of the kite bridle, the flying characteristics of kite 10 can be modified substantially. It is necessary to provide openings in the leading edge of the kite which will fill with air and be exited through the jet provided at the trailing edge 57, as shown in FIG. 5. In FIG. 5 it can be seen that air currents depicted as arrows 71 pass through kite body 11, as well as around on top and bottom to provide a downwash lifting effect as the air is exited.

Figure 3:
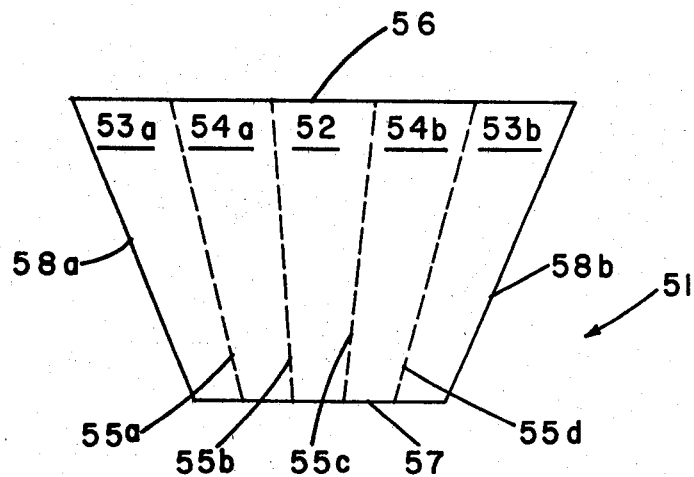
FIG. 3 is a top plan view of one piece of fabric used in construction of the kite.
Figure 4:
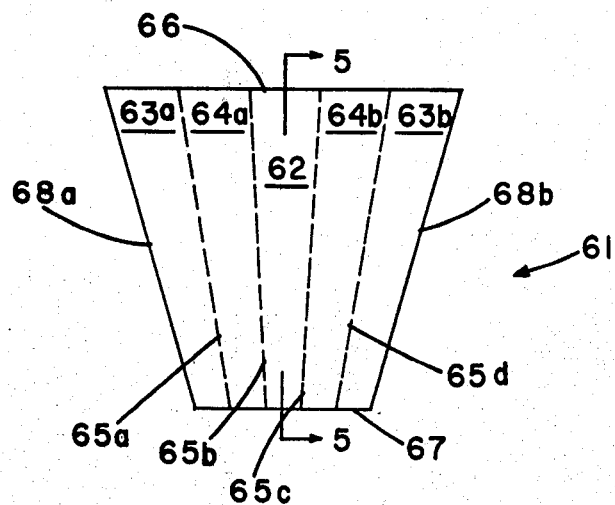
FIG. 4 is a bottom plan view of the fabric used in construction of the tubular foldable kite.

In FIGS. 3 and 4, both the top surface and bottom surface of kite body 11 is shown. FIG. 3 depicts the top panel 51 which has the plan form of a truncated triangle.

The triangle is provided with leading edge 56, side edges 58(a) and 58(b) and trailing edge 57. Stitch lines 55(a), 55(b), 55(c) and 55(d) are shown in FIG. 3 as they are attached to bottom panel 61, shown in FIG. 4, at stitch lines 65(a), 65(b), 65(c), 65(d) and 65(e) respectively. Side edge 58(a) is joined to side edge 68(a) and side edge 58(b) is joined to side edge 68(b). Thus, the kite body 11 is constructed from two panels, of which the top panel 51 is larger than bottom panel 61 and is sewn directly to bottom panel 61 along six angled seams. When so constructed, the kite provides five fabric tubes open at each end which allow air to flow through. As the air flows through the tubular construction, the air speed is decreased by the tubular construction, thus increasing the pressure within the tube and providing a stiffening and opening of the tubular members. Also, when the air is exited through trailing edge 57, the jet effect combined with the slight angle of attack of the kite provides a downwash which generates a sufficient lift to lift the kite body. It should be noted that the top leading edge 56 may be curved in order to properly join bottom leading edge 66, and top trailing edge 57 may be curved to properly join bottom trailing edge 67. Otherwise the joining of larger top panel 51 to smaller bottom panel 61 would be difficult.

Although it is contemplated that kite 10 is made of a fabric material and it has been found that a resin coated rip-stop nylon provides the ideal flying characteristics of the kite, any other lightweight material, including cloth or plastic, may be utilized with varying degrees of success.

Bridle 12 in the preferred embodiment is made from a 30 lb. test nylon monafilament line which is fastened to the kite at each corner at the bridle attachment points 13. Each arm of bridle 12 is equidistant from the center of the top edge of the top panel 56. In the preferred embodiment, a loop 14 is provided in the monafilament line of bridle 12 at the apex of bridle 14. Loop 14 thus allows kite line 15 to be attached to bridle 12 maintaining equidistance in bridle arms 12.

Referring now to FIG. 6 where kite 10 is shown employed in a kite fishing system. Kite line 15 attached to kite 10 is attached and controlled at fishing rod and reel 32. Fishing rod and reel 32 could be any conventional rod and reel including spinning or bait casting models, or one could fly kite 10 in any convenient manner for flying a kite. Conventional fishing rod and reel 33 with fishing line 20 extends along and parallel to kite line 15 until reaching kite line clip 16 and release pin 17. Fishing line 20 is removably attached to release pin 17 thus allowing a conventional hook, bait or lure to extend into the water. Kite line clip 16 is removably attached to kite line 15 and fishing line 20 is removably attached to release pin 17.

Figure 2:
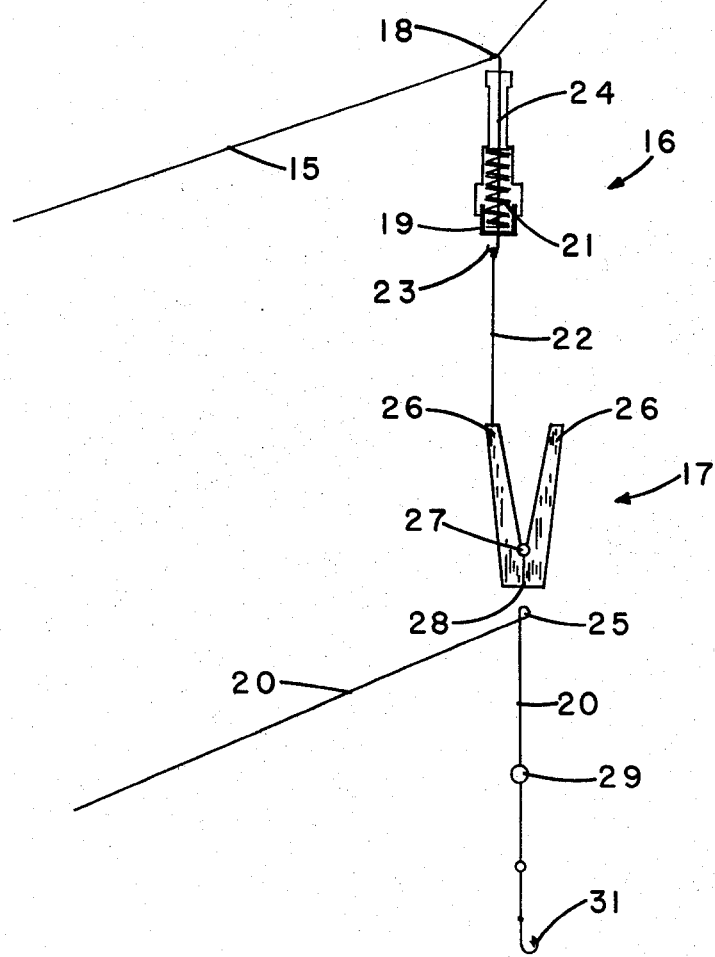
FIG. 2 is a right side elevational cutaway view of the kite line clip and fishing line release pin utilized in the kite fishing system.

Referring now to FIG. 2 wherein a detail of the first embodiment of the kite line clip and fishing line release pin is shown generally. Kite line clip 16 is provided with wire upper clip hook 18 which attaches to kite line 15 by being projected upward through tubular clip rod 24 and held against the upper end of tubular clip rod 24 by use of clip spring 21 which urges force against upper clip rod 24 and clip plunger button 19. Thus, the force of spring 21 clips kite line clip 16 to kite line 15 until the clip plunger button 19 is depressed, at which time upper clip hook 18 allows kite line 15 to be removed. Lower clip hook 23 is attached to clip line 22 which is a monafilament line further attached to release pin 17 at release pin arm 26. Release pin 17 could be a conventional clothes pin, however, it has been found in the preferred embodiment that release pin 17 provides a better release action for fishing line 20 if jaws 28 of release pin 17 are a flat surface and spring 27 is closer to the jaws 28 than is exhibited in a conventional clothes pin. It can be seen in FIG. 2 that line 20 is provided with half loop 25 which when placed in jaws 28 by depressing pin arms 26 that fishing line 20 can be more easily removed. Fishing line 20 is provided with a conventional tackle, such as a hook 31 and bobber, or any other bait lure combination which the fisherman wishes to use.

Figure 7:
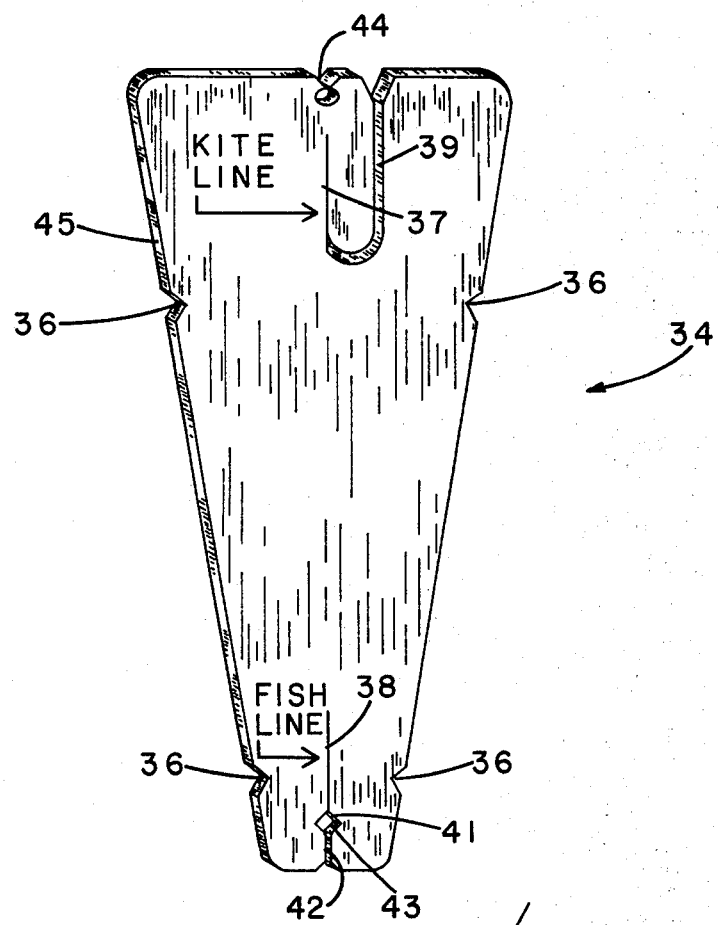
FIG. 7 is a perspective view of a second embodiment of a combined kite line clip and fishing line release pin.
Figure 8:
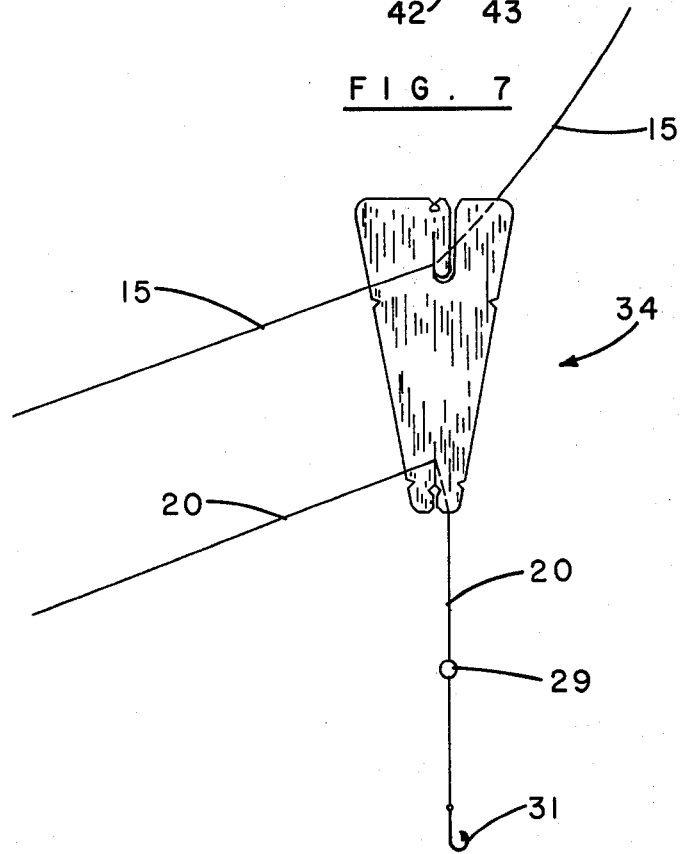
FIG. 8 is a perspective view of a second embodiment combined kite line clip and fishing line release pin attached to a kite line and fishing line.

In the second embodiment of the kite line clip and fishing line release pin, a single flat clip is provided as shown generally at 34 in FIG. 7 and FIG. 8. Referring to FIG. 7 it is shown that the second clip 34 is a generally triangular flat plate made of nylon, plastic or some other suitable flexible material. The flat clip is provided with rubber band indentations 36 at both upper and lower portions, as well as at the kite line guide channel 39 and kite line slip 37. In the upper portion of the clip 34 kite line guide channel 39 allows the kite line 15 to be inserted and then urged into kite line slit 37 which secures flat clip 34 to line 15 as shown in FIG. 8. Flat clip 34 can be removed or placed on kite line 15 quite easily by urging the kite line 13 in and out of kite line slit 7 by way of kite line guide channel 39. The lower end of flat clip 34 is provided with fishing line guide channel 42 and fish line diamond guide 41 as well as fish line slit 38. Since the diamond guide 41 provides a diamond shape with an apex at both the fish line groove channel 42 and at fish line slit 38, fish line 20 can easily be inserted by way of fish line guide channel 42 and pushed into fish line slit 38 so as to hold the fish line 20 by use of friction against fish line slit 38. Rubber band indentations 36 are provided in order to increase the tension on fish line slit 38 by employing one or more rubber bands (not shown) wrapped around and held against rubber band indentations 36. As can be seen in FIG. 8, when flat clip 34 is in proper position the weight of clip 34 and fishing line 20 with associated tackle would serve to pull flat clip 34 down, thus ensuring that the kite line frictionally engages kite line slit 37 so that kite line clip 34 is not released from the kite line except by pushing flat clip 34 up against the weight and guiding kite line 15 through kite line guide channel 39. The same is not true with the lower portion of the flat clip 34 in that a pull on or force on line 20 holds the fish line 20 out of frictional engagement with fish line slit 38 through diamond hole 41 and out fish line guide channel 42, thus releasing fish line 20 upon a sufficient force being exerted on fish line 20 in a downward direction.

An alternate method of using the kite fishing system can be employed in which a paper clip (not shown) or wire ring (not shown) is injected in the jaws 28 of release pin 17 or placed in diamond guide 41 of flat clip 34. Fishing line 20 is then led through the paper clip to freely move. The line 20 extends to the water. If a fish should strike hook 31, the paper clip would be pulled from jaws 28 or diamond guide 41. The advantage of this alternate method of fishing is that the free running fishing line would allow the hook or bait to remain in the water, even if the kite was subjected to gusts or moved up and down.

Although specific components, proportions and process steps have been stated in the above description of the preferred embodiments of the invention, other suitable materials, proportions and process steps as listed herein may be used with satisfactory results and varying degrees of quality. In addition, it will be understood that various other changes in details, materials, steps, arrangements of parts and used which have been herein described and illustrated in order to explain the nature of the invention will occur to and may be made by those skilled in the art, upon a reading of this disclosure, and such changes are intended to be included within the principles and scope of this invention as hereinafter claimed.

I claim:

1. A foldable kite, comprising
a flexible top panel having a generally trapezoidal shape and including a transverse top leading edge, a transverse top trailing edge shorter than said top leading edge and two elongated top side edges of generally equal length,
a flexible bottom panel having a generally trapezoidal shape and including a transverse bottom leading edge shorter than said top leading edge, a transverse bottom trailing edge shorter than said bottom leading edge and top trailing edge and two elongated bottom side edges of generally equal length,
the longitudinal spacing between the top leading and trailing edges being substantially equal to the longitudinal spacing between said bottom leading and trailing edges,
said top side edges being joined to said bottom side edges,
said top panel being furthermore secured to said bottom panel along a plurality of securement lines extending from said leading edges to said trailing edges in generally equally spaced relation between said side edges thereby defining a plurality of connected flexible tubes open at each end to allow air flow therethrough, and
a single bridle having only two arms wherein each of said two arms have a first end and a second end wherein said first ends of said arms are joined at an apex adapted for securement to a kite line and wherein said second ends of said arms are attached to respective joined ends of said leading edges.

2. The foldable kite of claim 1 wherein said top and bottom panels are arranged in close adjacent relation along said securement lines.

3. The foldable kite of claim 2 wherein said securement lines are stitch lines and further comprising thread woven through said top and bottom panels along said stitch lines.

* * * * *